(12) United States Patent
Fletcher et al.

(10) Patent No.: US 6,928,572 B2
(45) Date of Patent: Aug. 9, 2005

(54) MULTISTAGE CLOCK DELAY CIRCUIT AND METHOD

(75) Inventors: Thomas D. Fletcher, Portland, OR (US); Giao Pham, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 09/893,871

(22) Filed: Jun. 29, 2001

(65) Prior Publication Data

US 2003/0005345 A1 Jan. 2, 2003

(51) Int. Cl.[7] .................................................. G06F 1/10
(52) U.S. Cl. ...................... 713/401; 713/503; 327/100; 327/242
(58) Field of Search .............................. 713/400, 401, 713/500, 501, 503; 327/1, 100, 120, 158, 135, 136, 149, 161, 231, 237, 241, 242, 261, 392; 361/195; 375/294, 356, 373; 307/407, 409; 318/141; 326/93

(56) References Cited

U.S. PATENT DOCUMENTS

| | | | | | |
|---|---|---|---|---|---|
| 3,921,079 A | * | 11/1975 | Heffner et al. | ............... | 327/242 |
| 5,694,062 A | * | 12/1997 | Welch et al. | ................... | 327/3 |
| 6,119,242 A | * | 9/2000 | Harrison | ..................... | 713/503 |
| 6,208,907 B1 | | 3/2001 | Durham et al. | | |
| 6,731,683 B1 | * | 5/2004 | Fiedler et al. | ............... | 375/232 |

OTHER PUBLICATIONS

Yee et al, "Clock–Delayed Domino for Dynamic Circuit Design", IEEE Transactions on Very Large Scale Integration (VLSI) Systems, vol. 8, No. 4, Aug. 2000, pp 425–430.

Yee et al, "Clock–Delayed Domino for Adder and Combinational Logic Design", IEEE, 1063–6404/96, pp 332–337, 1996.

Jung, Perepelitsa, Sobelman, "Time Borrowing in High–Speed Functional Units Using Skew–Tolerant Domino Circuits," Proceedings, IEEE International Symposium on Circuits and Systems, pp. V–641–V–644, 2000.

Presentation by Carl Sechen dated Mar. 17, 2000.

Taub, *Digital Circuits and Microprocessors*, pp. 205–212, McGraw–Hill, 1982.

* cited by examiner

*Primary Examiner*—Thuan Du
(74) *Attorney, Agent, or Firm*—Kenyon & Kenyon (57) ABSTRACT

A clock delay circuit has a plurality of outputs to provide a sequence of clock signals that togther constitute a multistage clock. The circuit further has a delay adjustment input to adjust the timing of the clock signals for at least one of the outputs relative to the clock signals at another of the outputs. In an embodiment, the circuit has a plurality of these delay adjustment inputs. In a further embodiment, the circuit has a plurality of buffer components to delay the clock signals.

27 Claims, 4 Drawing Sheets

MULTISTAGE CLOCK DELAY CIRCUIT AND METHOD

FIELD OF THE INVENTION

Embodiments of the present invention relate to multistage clocks. In particular, embodiments of the present invention relate to the topology of circuits to delay a received clock signal into multiple clock stages.

BACKGROUND

Electronic systems such as micro-processors often use clock signals to synchronize operation of their various components. Such clock signals may be comprised of a stream of timing pules that occur at a particular rate which is known as the clock rate. In many systems, the operation of each of the components is timed from a single clock signal which may be referred to as the system clock. Some circuits have various stages, or sub-circuits, each of which is timed based upon a different clock. Such circuits may use multiple clocks that have the same rate (for example, the rate of the system clock) but with a delay between the clock signals. The different clock signals used by a circuit maybe referred to as different "clock stages" and a group of such signals may be referred to as a "multistage clock." For example, a second clock stage may be a delayed version of a first stage, a third stage may be a delayed version of the second stage, etc. Circuits that use a multistage clock may have a clock delay circuit or block that is used to delay a received clock, such as the system clock, to provide the various clock stages.

A "domino circuit" is one example of a type of circuit that uses a multistage clock. A domino circuit may be arranged with the outputs from one stage used as inputs into the next stage and with the clock delayed for each of the individual stages in order to provide a set-up time for the stages. Examples of domino circuits are self resetting domino circuits, single ended domino circuits, cascaded domino circuits, and zipper domino circuits.

In many circuits, the differential delay between clock stages determines to a large extent the delay of the logic. For some circuits, such as a cascaded differential domino circuit, it is necessary to create clock signals that have a small difference in the relative delay between stages, which may be referred to as the differential delay. These circuits may not operate properly where there is a significant difference in the relative amount of delay in the clock signals provided to different stages of the circuit. Numerous factors may impact the differential delay for the clock signals. For example, variations in the effective channel length, threshold voltage, or width of transistors in the clock delay circuit may cause differences in the delay. Device mismatches and cross-capacitance in the clock delay circuit may cause clock skew, and the delay of particular size inverter that is to be used in the clock delay circuit may vary due to process variables. In addition, there may be variations in the delay of the logic being driven by the clock signals. These and other factors have made it difficult to design and manufacture a clock delay circuit that provides clock signals with small differences in the relative delay between stages.

DETAILED DESCRIPTION

The present invention discloses topologies for clock delay circuits that provide a small differential in the delay between stages. Embodiments of the present invention reduce the number of elements from a common clocking point to the clock outputs, and thus reduce the number of devices mismatches and reduce the differential delay. For example, embodiments reduce the number of inverters used in the clock delay circuit. Embodiments also include delay adjustment blocks that allow for the adjustment of the relative delays. In further embodiments, the delay adjustment blocks are digitally adjustable. In still further embodiments, each stage of the clock is digitally controllable and these digital controls may be programmed to tune the differential delay provided at the clock stages.

Figure 1:
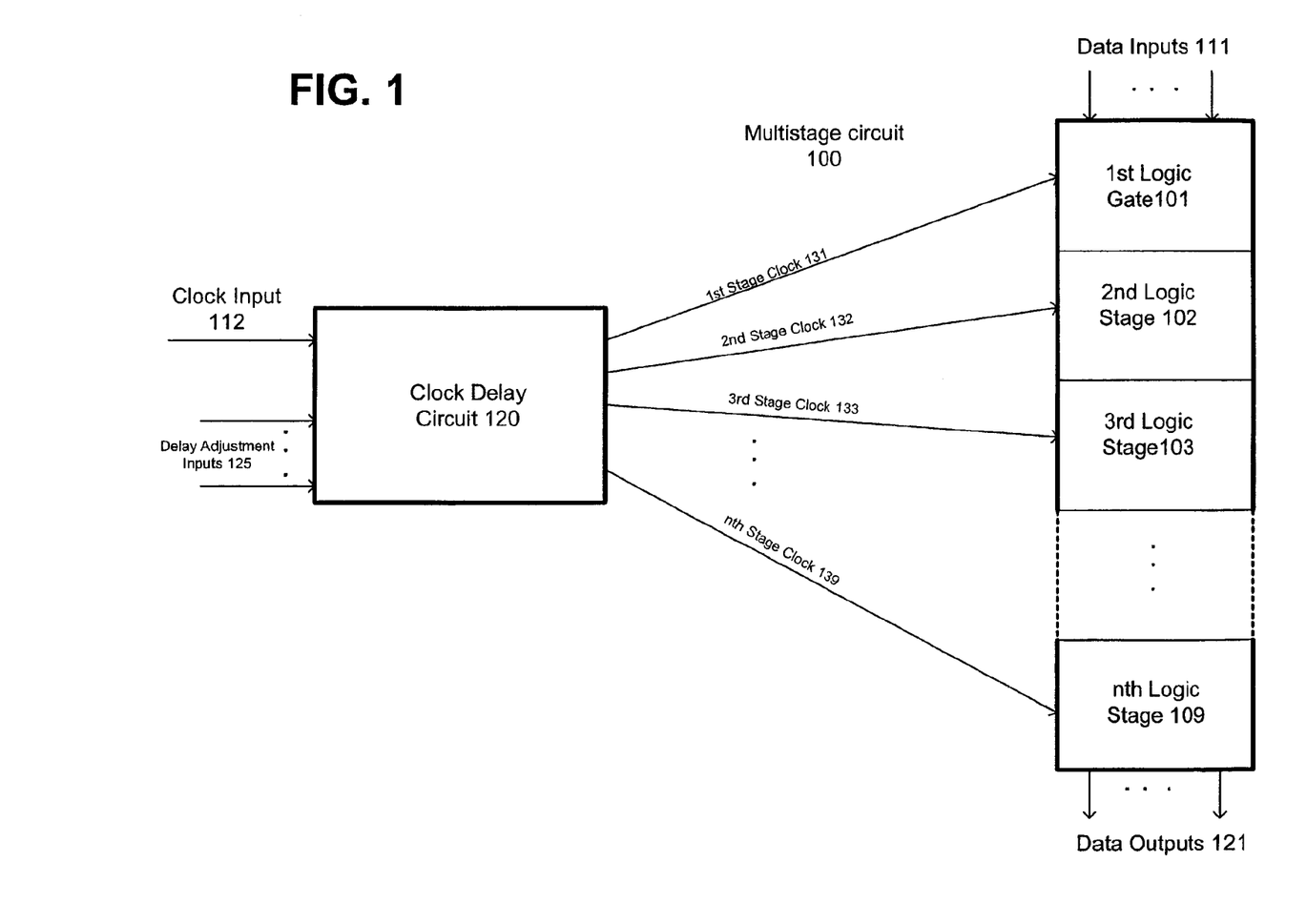
FIG. 1 is a block diagram of a circuit that uses a multistage clock according to an embodiment of the present invention.

FIG. 1 is a block diagram of a multistage circuit 100 according to an embodiment of the present invention. Multistage circuit 100 includes a first logic stage 101 to an nth logic stage 109 as well as a clock delay circuit 120 that has outputs connected to each of the logic stages. As used herein, the phrase "connected" encompasses both direct connections and indirect connections. Each logic stage may be a logic gate such as, for example, an AND gate. First logic stage 101 receives data inputs 111 and nth logic stage 109 provides data outputs 121. Multistage circuit 100 may contain any number of stages, and in one embodiment has eight stages. In an embodiment, each logic stage 101–109 may perform a function on its inputs and may pass its outputs as inputs to the next stage. Multistage circuit 100 may be, for example, a domino circuit, examples of which are discussed below.

Clock delay circuit 120 receives a clock input 112 and provides delayed clock signals (131–139) that form a multistage clock. As shown in FIG. 1, the multistage clock is input to the logic stages 101–109. In particular, clock delay circuit 120 outputs a first stage clock signal 131 that is input to first stage 101, a second stage clock signal 132 that is input to second logic stage 102, a third stage clock signal 133 that is input to third logic stage 103, and an nth stage clock signal 139 that is input to nth logic stage 109. Clock input 112 may be, for example, the system clock. In an embodiment, each of the clock stages 131–139 is a delayed version of the clock input 112, and each successive clock stage is further delayed from clock input 112. For example, there may be a delay of 12 picoseconds (ps) between each of the clock stages 131–139, with second stage clock 132 being 12 ps behind first stage clock 131, third stage clock 133 being 12 ps behind second stage clock 132, etc. This delay may provide set-up time for the logic stages 101–109. In embodiments of clock circuit 120, one example of which is shown in FIG. 2, the number of gates from a common clocking point to the clock outputs 131–139 is reduced in order to reduce the differential delay between clock stages.

Clock delay circuit 120 has a number of delay adjustment inputs 125 that may be used to adjust the relative amount of delay of clock stages 131–139. For example, a first delay adjustment input may delay the second stage clock 132 relative to the first stage clock 131, and a second delay adjustment input may delay the third stage clock 133 relative to both the second stage clock 132 and first stage clock 131. In an embodiment, an adjustment of the delay of a clock stage will also adjust all following stages by the same amount. For example, the first delay adjustment input may delay the second stage clock 132 and all following clock stages (e.g., third stage clock 133 to nth stage clock 139) relative to the first stage clock 131. When this embodiment is employed, an adjustment that increases the amount of delay between the first clock stage 131 and second clock stage 132, for example, will not reduce the amount of delay between the second clock stage 132 and third clock stage 133 because that adjustment will also increase the delay at the third clock stage (and all following stages) by the same amount. Clock delay circuit 120 may have any number of delay adjustment inputs. For example, clock delay circuit 120 may have one delay adjustment input or may have a delay adjustment input for every two adjacent clock stages. In an embodiment, delay adjustment inputs 125 are digital inputs, and thus the delay at the stages of the multistage clock is digitally controllable. An examples of the operation of delay adjustment inputs are described below with reference to FIG. 2.

In an embodiment, multistage circuit 100 is a cascaded differential domino circuit. A differential circuit may refer to a circuit that has two complimentary sets of input and output terminals, and one or more stages in multistage circuit 100 may be a differential circuit. In a cascaded domino circuit, each sage may be an N-channel metal-oxide semiconductor (NMOS) domino gate and the outputs of each stage maybe directly connected to the inputs of the next stage. Individual domino logic stages (e.g.,101–109) may have one or more precharge blocks, which force the circuit to a known state during one phase of a clock, and one or more evaluation blocks, which provide output values that are based on the input values. In an embodiment where multistage circuit 100 is a domino circuit, nth stage 109 maybe a converter that converts signals to static logic signals before they are output over outputs 121. The present invention may be used with domino circuits such as self resetting domino circuits, single ended domino circuits, cascaded domino circuits, and zipper domino circuits. In addition, the present invention may be used in static circuits and, moreover, in any circuits that use multistage clocks. Thus, clock circuit 120 is not limited to use in domino circuits and may be used in any circuits where sequence of delayed clock signals is to be used.

Figure 2:
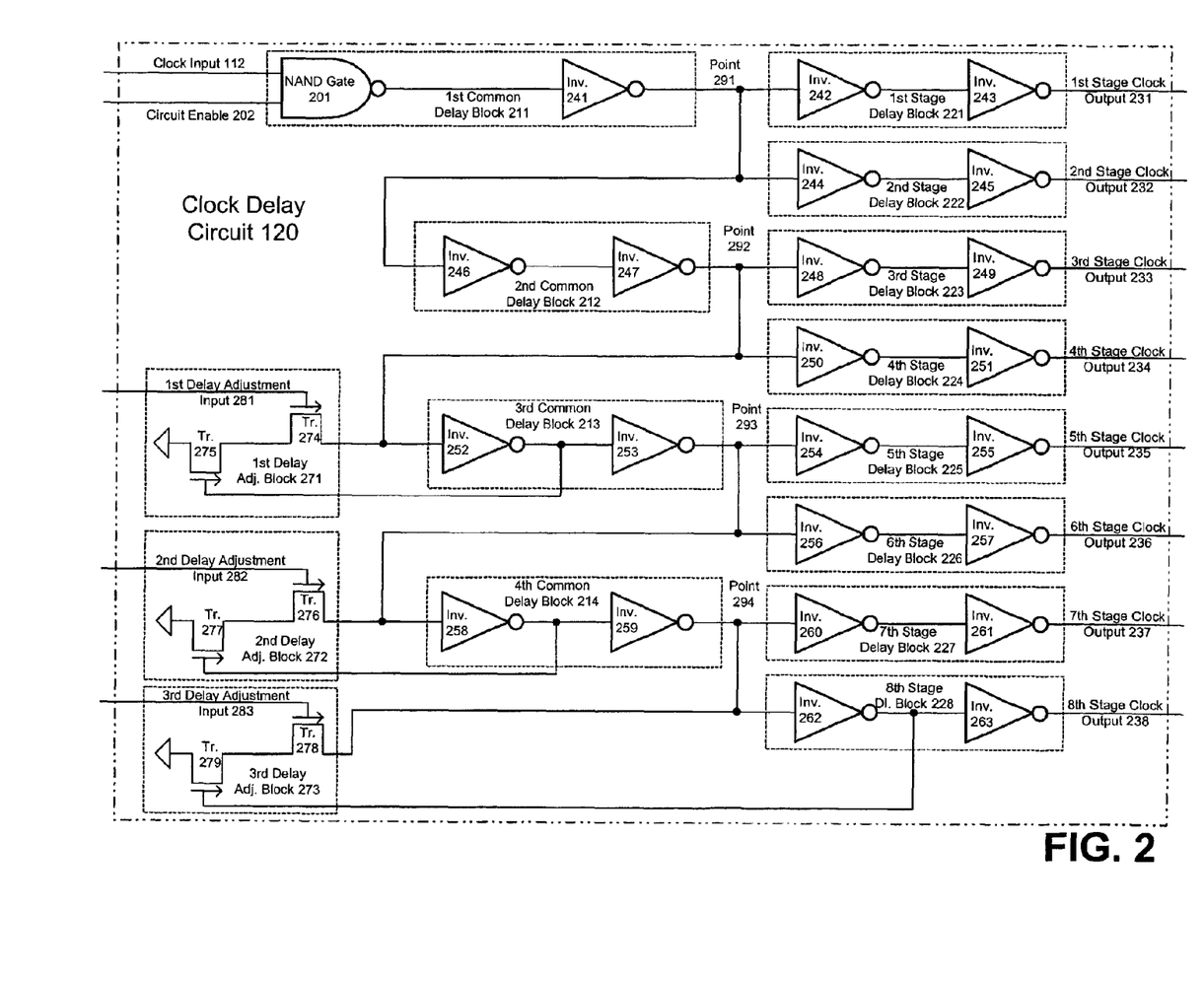
FIG. 2 is a partial block diagram of a clock delay circuit according to an embodiment of the present invention.

FIG. 2 is a partial block diagram of a clock delay circuit 120 according to an embodiment of the present invention. Clock delay circuit 120 has a clock input 112 to input a clock signal and a plurality of clock outputs 231–238 to output a multistage clock. The multistage clock in this example has eight stages, but in other embodiments may have more or less stages. Clock delay circuit contains a plurality of delay blocks (i.e., delay buffer components) 211–214 and 221–228 to delay the signals provided at the clock stage outputs and a plurality of delay adjustment blocks 271–273 to adjust the amount these signals are delayed. Four of the delay blocks (211–214) maybe referred to as common delay blocks in that the output of each of these delay blocks is used in providing two or more of the clock stage outputs. The other eight delay blocks (221–228) may be referred to as stage delay blocks in that they each only delay the signal for a single clock stage output. As shown in FIG. 2, the outputs of each of the common delay blocks (e.g., 212) is connected to two stage delay blocks (e.g., 223 and 224) and maybe connected to another common delay block (e.g., 213). The outputs of each of stage delay blocks 221–228 are connected respectively to the clock stage outputs 231–238. In the embodiment shown in FIG. 2, common delay blocks 212–224 and stage delay blocks 221–228 each comprise a chain of two inverters connected serially. In other embodiments, the delay blocks may contain other components that provide delay such as for example a NAND gate.

Clock delay circuit 120 will now be described in more detail. Clock input 112 is connected to a first common delay block 211, and the output of first common delay block 211 is connected through common point 291 as an input to each of first stage delay block 221 (chain of inverters 242 and 243), second stage delay block 222 (chained inverters 244 and 245), and second common delay block 212 (chained inverters 246 and 247). First common delay block 211 comprises a NAND gate 201 connected serially to an inverter 241. Thus, the output of NAND gate 201 is input to inverter 241, and the output of inverter 241 is the output of first common delay block 211. The inputs to NAND gate 201 are clock input 112 and circuit enable 202. When circuit enable 202 is low, clock delay circuit 120 is disabled and, thus, the multistage clock is stopped. Other embodiments of clock delay circuit 120 may not contain a circuit enable input and/or may not contain a first common delay block 211. The output of first stage delay block 221 is connected to first stage output 231, and the output of second stage delay block 222 is connected to second stage output 232.

The output of second common delay block 212 is connected through common point 292 as an input to each of third stage delay block 223 (chained inverters 248 and 249), fourth stage delay block 224 (chained inverters 250 and 251), and third common delay block 213 (chained inverters 252 and 253). Similarly, third common delay block 213 is connected through common point 293 as an input to each of fifth stage delay block 225 (chained inverters 254 and 255), sixth stage delay block 226 (chained inverters 256 and 257), and fourth common delay block 214 (chained inverters 258 and 259). Finally, fourth common delay block 214 is connected through common point 294 as an input to each of seventh stage delay block 227 (chained inverters 260 and 261) and eighth stage delay block 228 (chained inverters 262 and 263). In other embodiments that have more than eight clock stages, fourth common delay block 214 may be connected to a fifth common delay block. Embodiments that have less than eight clock stages may have less than four common delay blocks. As discussed above, the outputs of third stage delay block 223 to eighth stage delay block 228 are provided to third stage clock output 233 to eighth stage clock output 238.

In the embodiment shown in FIG. 2, there is a serial electrical connection path ("path") from the clock input 112 to each of the clock outputs 231–238. In an embodiment, each of the delay blocks 221–228 are part of a single path from clock input 112 to only one of the clock outputs. For example, first stage delay block 221 is part of the path from clock input 112 to first stage clock output 231 but is not part of the path from clock input 112 to any other clock output. By contrast, each common delay block (e.g., 214) in this embodiment is part of paths from the clock input 112 to at least two of the clock outputs (e.g., 237 and 238). The clock signal provided at point 291 is used to provide each of the clock stage outputs 231–238, the clock signal provided at point 292 is used to provide each of the clock stage outputs 233–238, the clock signal provided at point 293 is used to provide each of the clock stage outputs 235–238, and the clock signal provided at point 294 is used to provide each of the clock stage outputs 237–238. Points 291 to 294 may therefore be referred to as common clocking points. This embodiment reduces the number of elements from each common clocking point to the clock outputs.

In an embodiment, the clock outputs have a sequence (e.g., 231 is first, 232 is second, etc.) and there is a delay of approximately time t between each two adjacent clock signals in the sequence. In this embodiment, the amount of delay in the signal at each of the clock outputs differs from the amount of delay in the signal at the other clock outputs by approximately a multiple time t. In an embodiment, time t is approximately the high to low delay of an inverter with a fanout of 2. The time t could be faster or slower relative to an inverter with a fanout of 2 depending upon circuit complexity. A person of skill in the art would appreciate that an inverter has a fanout of 2 if the load on the output is two times the load on the input.

In an embodiment, the delay blocks delay the received clock input 112 so that each of the clock outputs 231 to 238 outputs a delayed version of the signal received at clock input 112, and the signal output at each of the clock outputs is delayed by more than the signal at the previous clock output. Thus, the second stage delay block 222 provides an additional delay t more than the first stage delay block 221, and together the second common delay block 212 and the third stage delay block 223 provide delay t more than the second stage delay block 222. In an embodiment, a common delay block such as 212 provides twice the differential delay between two adjacent stage delay blocks such as 221 and 222. For example, the invertors in the common delay blocks 212–214 (i.e., invertors 246, 247, 252, 253, 258, and 259) may each provide 12 ps of delay, the first invertors in stage delay blocks 221, 223, 225, and 227 (i.e., invertors 242, 248, 254, and 260) may each provide 12 ps of delay, the first invertors in stage delay blocks 222, 224, 226, and 228 (i.e., invertors 244, 250, 256, and 262) may each provide 24 ps of delay, and the second invertors in the stage delay blocks (i.e., invertors 243, 245, 249, 251, 255, 257, 261, and 263) may each provide 20 ps of delay. In this embodiment, the differential delay between stages is 12 ps, and each of the common delay blocks provides 24 ps of delay.

As discussed above, clock delay circuit 120 may contain a plurality of delay adjustment blocks (271–273). Each delay adjustment block may be used to vary the difference in the amount of delay in the signal at one of the clock outputs compared to the signal at another of the clock outputs. In an embodiment, each of the delay adjustment blocks varies the delay between one clock output in the multistage clock and all of the clock outputs that sequentially follow that clock output in the multistage clock. Each delay adjustment block may have an input (281–283) to adjust the timing of the clock signals for at least one of the outputs relative to the clock signals at another of the outputs. In an embodiment, these inputs may be used to digitally control the variation in the amount of delay, and the delay adjustment block may be a digital variable delay block.

Details of the delay adjustment blocks of the embodiment shown in FIG. 2 will now be described. Of course, in other embodiments the delay adjustment blocks may have other topologies and may, for example, be analog adjustment blocks. As shown in FIG. 2, each delay adjustment block comprises a chain of transistors connected serially having a drain connected to the output of one of the common delay blocks and a source connected to the ground. The gate of one of the transistors in each delay adjustment block is connected to a delay adjustment input, and the gate of the other transistor in the delay adjustment block is connected to a point between two inverters in one of the delay blocks. Thus, first delay adjustment block 271 comprises a transistor 274 and transistor 275. Transistor 274 has a drain connected the output of second common delay block 212, a source connected to transistor 275, and a gate connected to first delay adjustment input 281. Transistor 275 has a source connected to ground and a gate connected between inverters 246 and 247. Similarly, second delay adjustment block 272 comprises a transistor 276 and transistor 277. Transistor 276 has a drain connected the output of third common delay block 213, a source connected to transistor 277, and a gate connected to second delay adjustment input 282. Transistor 277 has a source connected to ground and a gate connected between inverters 258 and 259. Finally, third delay adjustment block 273 comprises a transistor 278 and transistor 279. Transistor 278 has a drain connected the output of fourth common delay block 214, a source connected to the drain of transistor 279, and a gate connected to third delay adjustment input 283. Transistor 279 has a source connected to ground and a gate connected between inverters 262 and 263.

The delay adjustment blocks may operate as follows. When the delay adjustment input (e.g., 281) is low, the delay adjustment block (e.g., 271) is disabled in that current will not flow though the first transistor (e.g., 274) in the delay adjustment block and, thus, the delay adjustment block does not have any impact on the clock delay circuit 120. When the delay adjustment input (e.g., 281) is high, the delay adjustment block (e.g., 271) is enabled in that current will flow from the output of a common delay block (e.g., 121) though the first transistor (e.g., 274) and the second transistor (e.g., 275) to the ground. The impact of the enabling of the delay adjustment block will therefore be the creation of a contention current on the output from the common delay block (e.g., 212). This contention current will increase the time it takes for the output of the common delay block to drive the delay blocks that receive that output (e.g., 223, 224, and 213). Thus, the enabling of the delay adjustment block may cause an additional delay in each of the clock stages (e.g., 233–238) that use the output from that common delay block. In an embodiment, this additional delay may be approximately 30% to 50% of the delay of an inverter with a fanout of 2. The second transistor in the delay adjustment block (e.g., 275) may be used to stop the effect of the contention current once the inverter being driven by the delay adjustment block (e.g., inverter 252) reaches its threshold. Prior to reaching its threshold, the output of this inverter will be high, and thus the gate of the second transistor will receive a high input and the current will flow through the transistor to ground. When the inverter reaches its threshold, the output of this inverter will be low, and thus the gate of the second transistor will receive a low input and the contention current will no longer flow through the delay adjustment block to ground. By use of a delay adjustment block, the differential delay between a clock stage and all following clock stages may be adjusted. In the embodiment of FIG. 2, the differential delay may be increased. Embodiments of the present invention may use one or more delay adjustment blocks.

Figure 3:
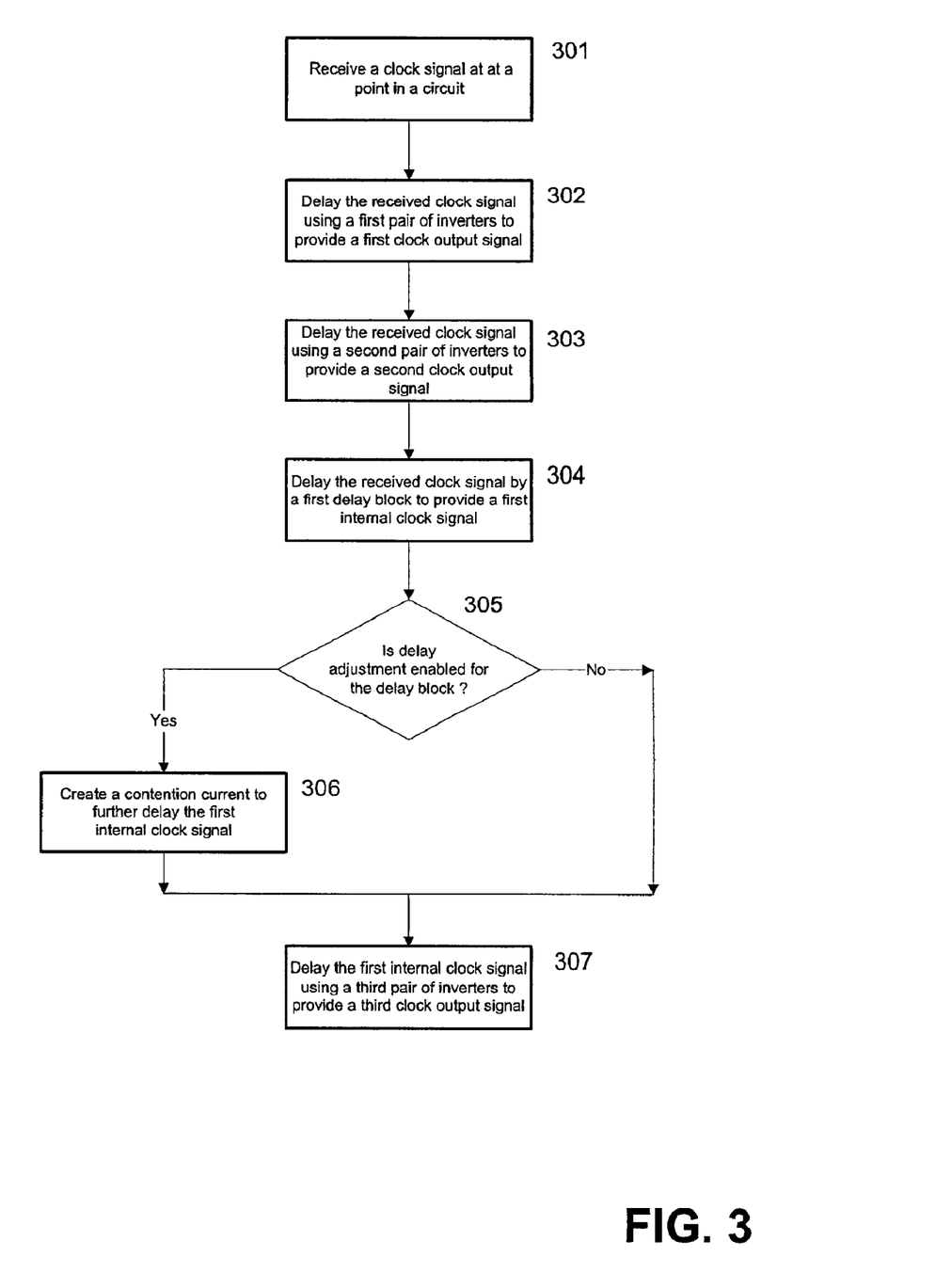
FIG. 3 is a flow diagram of a method of providing a plurality of delayed clock signals according to an embodiment of the present invention.

FIG. 3 is a flow diagram of a method of providing a plurality of delayed clock signals according to an embodiment of the present invention. This example method will be explained with reference to the embodiment shown in FIG. 2, but of course this method may also be used with other embodiments of the invention. A clock signal is received at a point in a circuit such as common point 291 (301). The received clock signal is delayed by a first pair of inverters (242 & 243) to provide a first clock output signal at 231 (302). In addition, the clock signal received at point 291 is delayed by a second pair of inverters (244 & 245) to provide a second clock output signal at 232 (303). In an embodiment, the second clock output signal (at 232) is delayed by a time t from the first clock output signal (at point 231). In addition, the received clock of point 291 is delayed by a first delay block (212) to provide a first internal clock signal at 292 (304). In an embodiment, the first delay block comprises a pair of inverters. In embodiment, the first internal clock signal is delayed by time 2t from the received clock signal. If a first delay adjustment enabled input is received at input 281 and delay adjustment is therefore enabled for the first delay block 271 (305), a contention current is created to further delay the first internal clock signal at 292 (306). In an embodiment, the contention current may be created by turning on a transistor (e.g., transistor 274) to create a path to ground for the first internal clock signal (that is, the signal at 292). According to this method, the first internal clock signal at 292 (which may or may not have been additionally delayed by the contention current) is then delayed using a third pair of inverters (248 & 249) to provide a third clock output signal (307). In an embodiment, the third clock output signal at 233 is delayed by time t from the second clock output signal at 232. In an embodiment, the time t is approximately equal to the delay of an inverter with a fanout of 2.

The method described above may be repeated for additional clock stages. For example, in a further embodiment, the first internal clock signal is delayed using a fourth pair of inverters (250 & 251) to provide a fourth clock output signal that is delayed by time t from the third clock output signal. In a still further embodiment, the first internal clock signal is also delayed using a second delay block (213) to provide a second internal clock signal at 293 that is delayed by time 2t from the first internal clock signal. In a still further embodiment, the second internal clock signal is delayed using a fifth pair of inverters to provide a fifth clock output signal that is delayed by time t from the fourth clock output signal. If a second delay adjustment enable input is received (e.g., at 282), then delay adjustment is enabled for the second delay block and a contention current is created to further delay the second internal clock signal. In a further embodiment, the second internal clock signal is delayed using a sixth pair of inverters to provide a sixth clock output signal that is delayed by time t from the fifth clock output signal. In this same way, additional stages may also be included, some or all of which have delay adjustment blocks.

Figure 4:
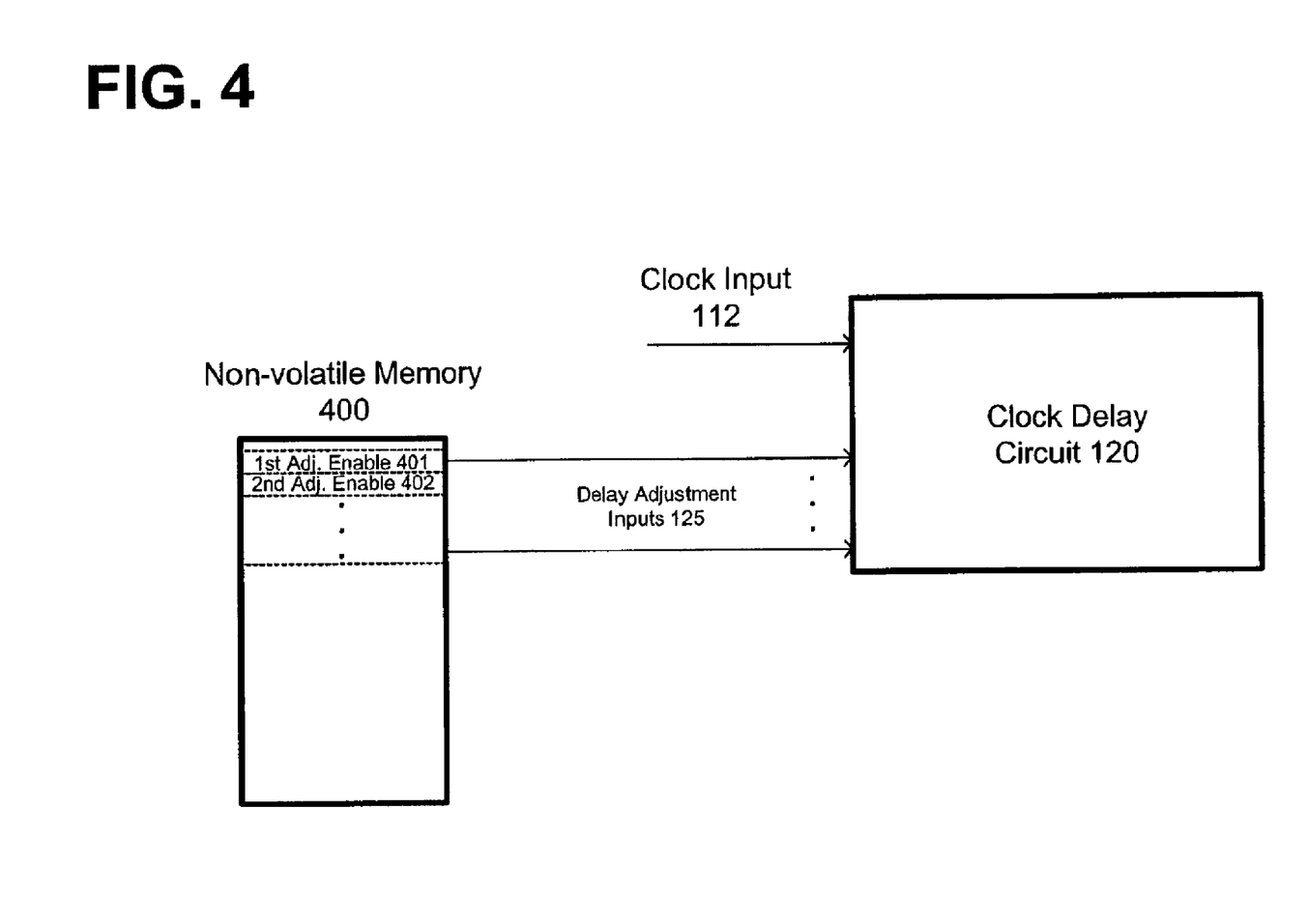
FIG. 4 is a block diagram of a circuit that uses a multistage clock having programable adjustable delays according to an embodiment of the present invention.

FIG. 4 is a block diagram of a circuit that includes a clock delay circuit 120 which has programable adjustable delays according to an embodiment of the present invention. As discussed above with reference to FIGS. 1 and 2, FIG. 4 shows a clock delay circuit 120 having a clock input 112 and a plurality of delay adjustment inputs 125. In this embodiment, each of the delay adjustment inputs is connected (e.g., by a bus) to a non-volatile memory 400 such as a disk drive. Non-volatile memory 400 includes a plurality of storage elements (e.g., a bits) for each of the delay adjustment inputs. For example, FIG. 4 shows non-volatile memory 400 as containing first adjustment enable storage location 401 and second adjustment enable storage location 402. In an embodiment, when a storage location corresponding to a enable adjustment input (e.g., 401) is set, then the corresponding enable input will input an enable signal to clock delay circuit 120 and an appropriate adjustment will be made to the clock stages as discussed above. In an embodiment, a scan chain may be connected between the non-volatile memory 400 and the clock delay circuit 120 and the bits of the scan chain may be loaded from the non-volatile memory during, for example, power up. In this embodiment, the scan chain provides the delay adjustment inputs. In another embodiment, the delay adjustment inputs 125 maybe connected to a control register and may be dynamically controlled. This embodiment may be useful, for example, in testing and debugging the circuit. In other embodiments the enable information may be hard-coded.

Embodiments of the present invention reduce the number of devices from a common point in the delay circuit to the clock outputs of the delay circuit in order to reduce the number of device mismatches that may be present. Embodiments also allow for the digital adjustment of the delays at each clock stage so that these delays may be programmed to compensate for unwanted delay differentials. The variable delay elements allow for the selection of small delays with adequate self timed margins and thus compensate for device variations as well as cross-capacitance. In embodiments of the present invention, the inverters are tunned to provide a small delay. This aspect may cause a loss in gain and a reduction in the fanout. The present invention is constructed so that process variations in Leff, Vt and Z have a minimal effect on the differential delay by reducing the difference from the common clocking point while at the same time maintaining sharp edge-rates to preserve signal integrity.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, although FIG. 2 shows the output of common delay blocks being connected to two stage delay blocks, in other embodiments the output of a common delay block may be connected to three or more stage delay blocks. In addition, the clock delay circuit may contain any number of stages and any number of delay adjustment blocks.

What is claimed is:

1. A circuit comprising:

a plurality of outputs to provide a sequence of clock signals which together comprise a multistage clock; and a delay adjustment input to adjust the timing of the clock signals for at least one of the outputs relative to the clock signals at another of the outputs, wherein the adjustment of the timing of the clock signal at said one output is to adjust the timing of the clock signal at outputs that follow said one output in the multistage clock.

2. The circuit of claim 1, wherein the circuit has a plurality of said delay adjustment inputs.

3. The circuit of claim 1, wherein the delay adjustment input is to adjust the timing of the clock signal by use of a contention current.

4. The circuit of claim 1, wherein the circuit further comprises a delay adjustment block coupled to the delay adjustment input, and wherein the delay adjustment block comprises a pair of transistors connected serially.

5. The circuit of claim 4, wherein the circuit further comprises a plurality of first delay blocks and a plurality of second delay blocks, and wherein each of said first delay blocks comprises a pair of inverters connected serially, and wherein each of said second delay blocks comprises a pair of inverters connected serially.

6. A circuit comprising:

a clock input to receive a clock input signal;

a plurality of clock outputs to each provide a delayed version of the clock input signal, wherein the clock outputs have a sequential order; and a plurality of delay adjustment blocks to vary the difference in the amount of delay in the signal at one of the clock outputs compared to signal at the a clock output that precedes said one of the clock outputs in the sequential order, wherein each of the delay adjustment blocks varies the delay between an associated clock output and clock outputs that follow that output in the sequential order.

7. The circuit of claim 6, wherein the delay adjustment block has an input to digitally control the variation in the amount of delay.

8. The circuit of claim 6, wherein the amount of delay in the signal at each of the clock outputs differs from the amount of delay in the signal at the other clock outputs by approximately a multiple of a time t, and wherein the time t is approximately the delay of an inverter with a fanout of 2.

9. A circuit comprising:

a clock input;

a plurality of clock outputs;

a plurality of first delay blocks each of which is coupled to provide an output to a clock output;

a plurality of second delay blocks each of which is coupled to provide an output to two first delay blocks;

a delay adjustment block connected to an output of one of the second delay blocks;

wherein each of the first delay blocks is on a single path from the lock input to a clock output; and wherein each of the second delay blocks is on one path from the clock input to one of the clock outputs and is on another path from the clock input to another of the clock outputs.

10. The circuit of claim 9, wherein said first delay blocks and second delay blocks each comprise a pair of inverters connected serially.

11. The circuit of claim 10, wherein the delay adjustment block comprises a pair of transistors connected serially.

12. The circuit of claim 9, wherein the delay adjustment block is a digital variable delay block.

13. A method of providing a plurality of delayed clock signals, the method comprising:

receiving a clock signal at a point in a circuit;

delaying the received clock signal using a first pair of inverters to provide a first clock output signal;

delaying the received clock signal using a second pair of inverters to provide a second clock output signal that is delayed by approximately a time t from the first clock output signal;

delaying the received clock signal using a first delay block to provide a first internal clock signal that is delayed by approximately time 2t from the received clock signal; and delaying the first internal clock signal using a third pair of inverter to provide a third clock output signal that is delayed by approximately time t from the second clock output signal.

14. The method of claim 13, wherein the first delay block comprises a pair of inverters.

15. The method of claim 14, wherein providing a first internal clock signal includes:

receiving a first enable input signal; and delaying the first internal clock signal by creating a contention current.

16. The method of claim 15, wherein creating the contention current comprises turning on a transistor to create a path to ground for the first internal clock signal.

17. The method of claim 13, further comprising:

delaying the first internal clock signal using a fourth pair of inverters to provide a fourth clock output signal that is delayed by approximately time t from the third clock output signal;

delaying the first internal clock signal using a second delay block provide a second internal clock signal that is delayed by approximately time 2t from the first internal clock signal;

delaying the second internal clock signal using a fifth pair of inverters to provide a fifth clock output signal that is delayed by approximately time t from the fourth clock output signal; and delaying the second internal clock signal using a sixth pair of inverters to provide a sixth clock output signal that is delayed by approximately time t from the fifth clock output signal.

18. The method of claim 17, wherein providing a second internal clock signal includes:
   receiving a second enable input signal; and
   delaying the second internal clock signal by creating a contention current.

19. The method of claim 18, wherein the time t is approximately equal to the delay of an inverter with a fanout of 2.

20. A circuit comprising:
   a clock input;
   a first chain of two inverters having an input connected to said clock input and having an output connected to a first clock output;
   a second chain of two inverters having an input connected to said clock input and having an output connected to a second clock output;
   a third chain of two inverters having an input connected to said clock input and having an output; and
   a fourth chain of two inverters having an input connected to the output of the third chain of inverters and having an output connected to a third clock output.

21. The circuit of claim 20, further comprising:
   a first transistor connected to the output of the third chain of inverters and having a gate connected to a first enable input; and
   a second transistor connected to the first transistor and to ground.

22. The circuit of claim 21, wherein the circuit further comprises:
   a fifth chain of two inverters having an input connected to the output of the third chain of inverters and having an output connected to a fourth clock output;
   a sixth chain of two inverters having an input connected to output of the third chain of inverters and having an output; and
   a seventh chain of two inverters having an input connected to the output of the sixth chain of inverters and having an output connected to a fifth clock output.

23. The circuit of claim 22, wherein the second transistor has a gate that is connected to a point between the inverters in the sixth chain of inverters.

24. The circuit of claim 23, wherein the circuit further comprises:
   an eighth chain of two inverters having an input connected to the output of the sixth chain of inverters and having an output connected to a sixth clock output;
   a ninth chain of two inverters having an input connected to output of the sixth chain of inverters and having an output;
   a tenth chain of two inverters having an input connected to the output of the ninth chain of inverters and having an output connected to a seventh clock output; and
   a third transistor connected to the output of the ninth chain of inverters and having a gate connected to a second enable input.

25. A method of adjusting the delay of a clock signal in a multistage clock, the method comprising:
   determining that the delay between one stage of a multistage clock and the following stage of the multistage clock is too large; and
   setting a first storage element which will later cause the input of a clock adjustment signal to a clock delay circuit and thereby create a contention current to reduce the delay between said one stage of the multistage clock and said following stage.

26. The method of claim 25, wherein the method further comprises:
   determining that the delay between a third stage of the multistage clock and a fourth stage of the multistage clock is too large; and
   setting a second storage element which value will later cause the input of a second clock adjustment signal to the clock delay circuit and thereby reduce the delay between said third stage and said fourth stage.

27. The method of claim 26, wherein setting the first storage element reduces the delay between said one stage and all following stages.

* * * * *

UNITED STATES PATENT AND TRADEMARK OFFICE
CERTIFICATE OF CORRECTION

PATENT NO. : 6,928,572 B2
DATED : August 9, 2005
INVENTOR(S) : Thomas D. Fletcher et al.

It is certified that error appears in the above-identified patent and that said Letters Patent is hereby corrected as shown below:

Column 9,
Line 52, "to signal at the a clock" should be -- to the signal at a clock --;

Column 10,
Line 57, "delay block provide" should be -- delay block to provide --.

Signed and Sealed this

Seventh Day of March, 2006

JON W. DUDAS
*Director of the United States Patent and Trademark Office*